US012761155B2

(12) United States Patent
Kopatz et al.

(10) Patent No.: US 12,761,155 B2
(45) Date of Patent: Oct. 13, 2026

(54) METHOD AND APPARATUS FOR SENSING HUMIDITY

(71) Applicant: National Technology & Engineering Solutions of Sandia, LLC, Albuquerque, NM (US)

(72) Inventors: Jessica Whitney Kopatz, Edgewood, NM (US); Christine Cardinal Roberts, Albuquerque, NM (US); Koushik Ghosh, Albuquerque, NM (US); Anthony Michael McMaster, Albuquerque, NM (US); Matthew Kaboolian, Syosset, NY (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 410 days.

(21) Appl. No.: 18/628,868

(22) Filed: Apr. 8, 2024

(65) Prior Publication Data

US 2025/0314595 A1 Oct. 9, 2025

(51) Int. Cl.
*G01N 21/81* (2006.01)

(52) U.S. Cl.
CPC .................................... *G01N 21/81* (2013.01)

(58) Field of Classification Search
None
See application file for complete search history.

(56) References Cited

FOREIGN PATENT DOCUMENTS

CN 114813855 * 7/2022 ............. G01N 27/12

OTHER PUBLICATIONS

Ghanbari, M. et al. Injectable hydrogels based on oxidized alginate-gelatin reinforced by carbon nitride quantum dots for tissue engineering, International Journal of Pharmaceutics, 602 (2021) 120660 (Year: 2021).*

Qin, Y. et al. Dual-Emission Carbon Dots for Ratiometric Fluorescent Water Sensing, Relative Humidity Sensing, and Anticounterfeiting Applications, ACS Applied Nano Materials, 2021, 4, 10674-10681 (Year: 2021).*

Galindo, F. et al. Water/humidity and ammonia sensor, based on a polymer hydrogel matrix containing a fluorescent flavylium compound, Journal of Materials Chemistry 2005, 15, 2840-2847 (Year: 2005).*

Wang, J. et al. Construction of high-strength p(HEMA-co-AA) fluorescent hydrogels based on modified carbon dots as chemically crosslinkers, Colloid and Polymer Science (2018) 296:745-752 (Year: 2018).*

* cited by examiner

*Primary Examiner* — Xiaoyun R Xu
(74) *Attorney, Agent, or Firm* — Yee & Associates, P.C.; Gregory M. Doudnikoff; Mario A. Burgarello

(57) ABSTRACT

A humidity sensor is provided. The humidity sensor comprises a hydrogel made from hydrophilic polymer and carbon nitride dots embedded in the hydrogel. The carbon nitride dots generate a colorimetric response in visible light in response to absorption of moisture by the hydrogel. Conversely, the colorimetric response of the carbon nitride dots reverses in response to loss of moisture in the hydrogel. Changes in humidity can be detected according to the colorimetric response of the carbon nitride dots in the hydrogel.

16 Claims, 5 Drawing Sheets

50% HUMIDITY, 50°C, 48 HOURS

METHOD AND APPARATUS FOR SENSING HUMIDITY

STATEMENT OF GOVERNMENT INTEREST

This invention was made with United States Government support under Contract No. DE-NA0003525 between National Technology & Engineering Solutions of Sandia, LLC, and the United States Department of Energy. The United States Government has certain rights in this invention.

BACKGROUND INFORMATION

1. Field

The present disclosure relates generally to humidity sensing and more specifically to a method and apparatus for sensing humidity using hydrogel and carbon dots.

2. Background

Hydrogel is a material made of three-dimensional networks of hydrophilic polymer chains. Hydrogel exhibits the ability to absorb and retain water or other fluids to a significant extent. This property makes hydrogel valuable in various scientific and industrial applications.

For example, hydrogel is widely used in the medical field as a drug delivery vehicle. Hydrogel is also used in dressings to create a moist environment that supports wound healing, prevent the dressings from adhering to the wound, and provide protective barriers. Hydrogel has also been incorporated into contact lenses for retaining moisture for wearers.

Hydrogels also have agricultural applications that enhance water retention in soil.

SUMMARY

An illustrative embodiment provides a humidity sensor comprising a hydrogel made from hydrophilic polymer and carbon nitride dots embedded in the hydrogel. The carbon nitride dots generate a colorimetric response in visible light in response to absorption of moisture by the hydrogel. Conversely, the colorimetric response of the carbon nitride dots reverses in response to loss of moisture in the hydrogel.

Another illustrative embodiment provides a method of synthesizing a carbon nitride dot-doped nanocomposite hydrogel. The method comprises mixing a hydrophilic polymer with carbon nitride dots. 1.5 vol % of a photo initiator is added to the mixture of hydrophilic polymer and carbon nitride dots, and the mixture of hydrophilic polymer, carbon nitride dots, and photo initiator is exposed to ultraviolet light to produce a hydrogel embedded with the carbon nitride dots, wherein the carbon nitride dots generate a colorimetric response in visible light in response to absorption of moisture by the hydrogel.

Another illustrative embodiment provides a method of detecting humidity. The method comprises embedding carbon nitride dots into a hydrogel comprising a hydrophilic polymer. The carbon nitride dots generate a colorimetric response in visible light in response to absorption of moisture by the hydrogel. The colorimetric response of the carbon nitride dots reverses in response to loss of moisture in the hydrogel. Changes in humidity are detected according to the colorimetric response in visible light of the carbon nitride dots in the hydrogel.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1A:
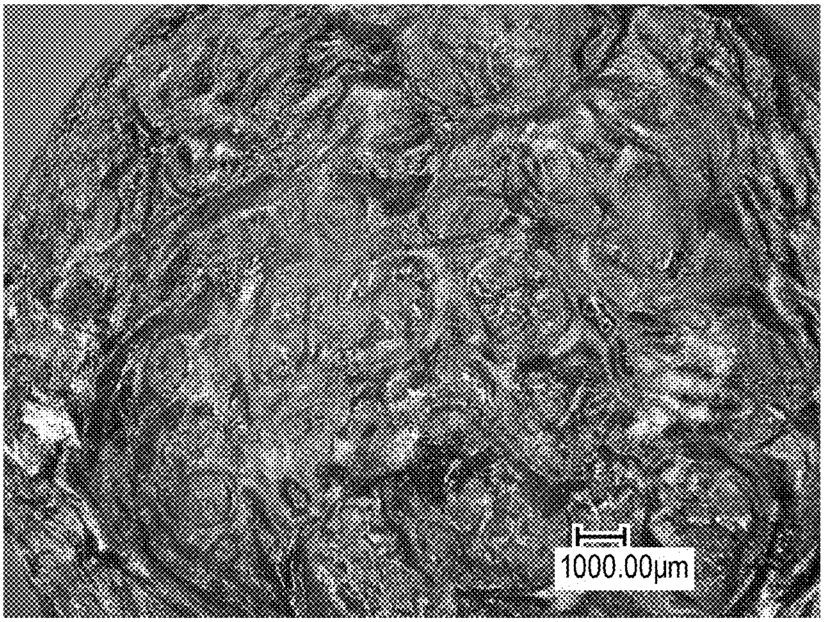
FIG. 1A depicts a hydrogel mixed with carbon nitride dots under dry conditions in accordance with an illustrative embodiment.

The illustrative embodiments recognize and take into account one or more different considerations. The illustrative embodiments recognize and take into account that hydrogel can be used as sensor technology to monitor moisture levels or detect aqueous substances.

The illustrative embodiments also recognize and take into account that one of the unique characteristics for carbon dots is photoluminescence which enable the carbon dots to emit light when stimulated by an external source.

The illustrative embodiments provide a passive in-situ humidity detector based on hydrogel-containing color-change carbon nanodots. The sensor allows for a nondestructive, nontoxic, and photostable use case. Due to the reversible nature upon drying of the sensor while being photostable allows the gel sensor to be used in many industries including, but not limited to, pharmaceuticals, mining, electronics, and aerospace. Since the hydrogel has an affinity for water, and the carbon dots change color due to oxidation in water as the gel soaks up water either from humidity or water droplets, the carbon dots will change different colors representative of different concentrations of available water in the environment. The structure independence of this carbon dot sensing component allows for a multitude of compatible material substrates. Furthermore, the fact that few specialized chemicals and commercial off-the-shelf equipment can be used allows for rapid and economic production of sensors.

Carbon nitride dots are zero-dimensional nanoparticles that have excitation-wavelength-dependent multiple emission states. Carbon nitride dots have various advantages over other types of nanoparticles. For example, carbon nitride dots have high photostability, low cost, good biocompatibility, high water solubility, and tunable photoluminescence. Carbon nitride dots are inexpensive to synthesize, and hydrogels are low-cost materials, making carbon nitride dot-based hydrogel humidity sensors an attractive option for cost-sensitive applications.

Hydrogels are three-dimensional networks of hydrophilic polymers that can absorb a large amount of water. Combining carbon nitride dots with hydrogels results in a novel material with enhanced humidity sensing properties. Carbon nitride dots can impart fluorescence, chirality, stimulus response, self-healing, and improved mechanical strength to hydrogels. Hydrogels in turn can prevent aggregation-caused quenching (ACQ) of carbon nitride dots and enhance their stability.

Carbon nitride dot-based hydrogel humidity sensors are relatively simple and can be easily fabricated without using complex or expensive equipment. They have high sensitivity to humidity changes, outperforming many convention humidity sensors. Furthermore, carbon nitride dot-based hydrogel humidity sensors exhibit rapid response times due to their porous structure and efficient water absorption ability.

In addition, the properties of carbon nitride dots-based hydrogel humidity sensors can be tuned by controlling the synthesis parameters of both carbon nitride dots and hydrogels, allowing for development of sensors with tailored characteristics. These properties make carbon nitride dots good candidates for applications in biomedicine, sensing, optoelectronic devices, and anticounterfeiting.

Figure 1B:
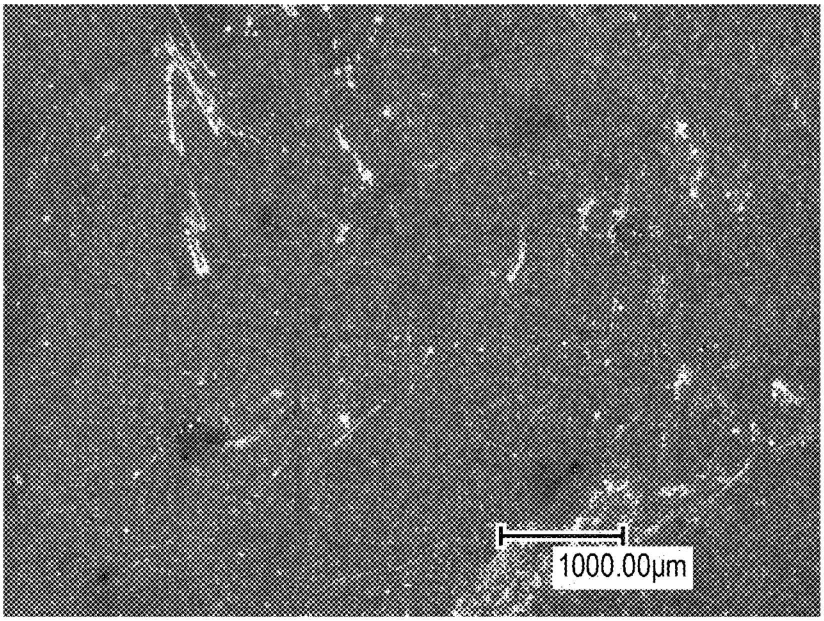
FIG. 1B depicts a magnified view of the hydrogel shown in FIG. 1A.

FIG. 1A depicts a hydrogel mixed with carbon nitride dots under dry conditions in accordance with an illustrative embodiment. FIG. 1B depicts a magnified view of the hydrogel shown in FIG. 1A. As pictured, the hydrogel shown in FIGS. 1A and 1B is relatively light in tone under dry conditions.

In response to exposure to humidity, the hydrogel absorbs the moisture, causing the carbon nitride dots to generate an easily detectable colorimetric response in visible light. For example, the carbon nitride dots might change color and darken. Carbon nitride dots have active sites sensitive to water molecules. When exposed to moisture, these sites interact with water, altering their electronic structure and triggering a color shift.

Figure 2A:
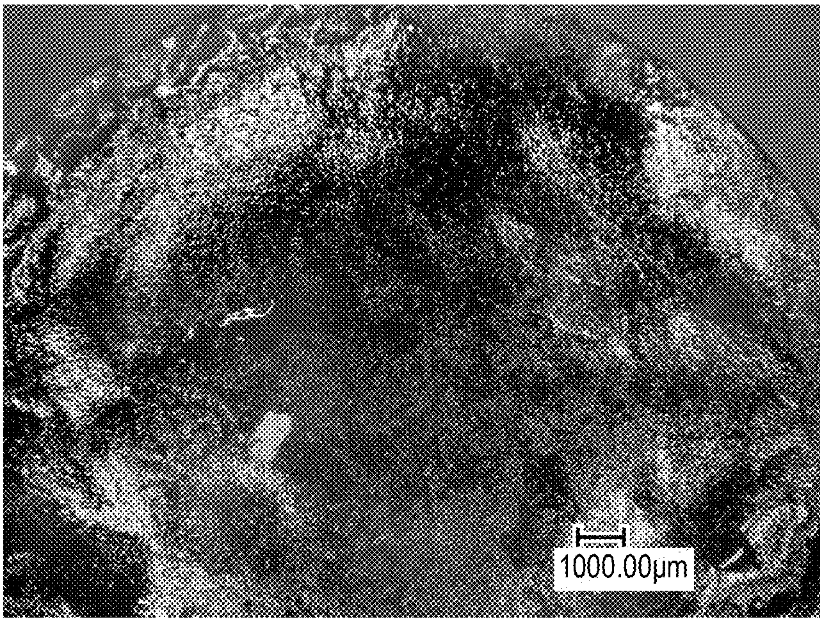
FIG. 2A depicts a hydrogel mixed with carbon nitride dots exposed to humidity in accordance with an illustrative embodiment.
Figure 2B:
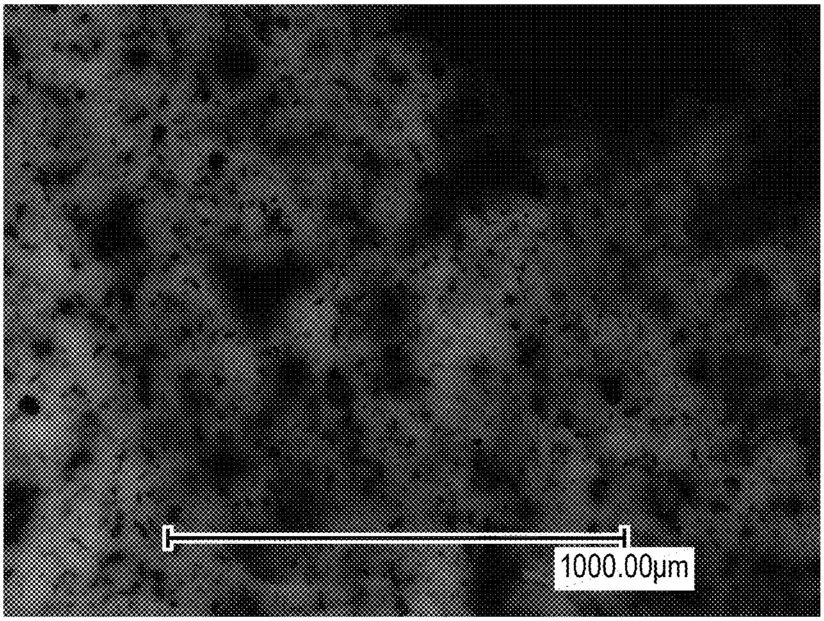
FIG. 2B depicts a magnified view of the hydrogel shown in FIG. 2A.

FIG. 2A depicts a hydrogel mixed with carbon nitride dots exposed to humidity in accordance with an illustrative embodiment. FIG. 2B depicts a magnified view of the hydrogel shown in FIG. 2A. In the present example, the hydrogel-carbon nitride dot mixture was exposed to 95% humidity for 24 hours.

As shown in FIGS. 2A and 2B, in response to exposure to the humidity in the surrounding environment, the carbon nitride dots in the hydrogel darken, resulting in an overall darker appearance of the hydrogel compared to the hydrogel under dry conditions as shown in FIGS. 1A and 1B. The hydrophilic polymer matrix not only provides structural support for the humidity sensor but also facilitates water uptake, ensuring the carbon nitride dots are exposed to moisture for efficient color change. While the carbon nitride dots are the primary sensing element, the hydrophilic polymer matrix acts as a crucial secondary enabler by stabilizing the sensor structure and promoting water interaction with the carbon nitride dots for faster and more sensitive color changes.

Several types of hydrophilic polymers can be employed in the illustrative embodiments, each offering unique advantages. Glyceryl methacrylate includes numerous hydroxyl groups for strong water interaction. Hydroxyethylmethacrylate (HEMA) with varying polyethylene glycol (PEG) side chains allows tuning of water uptake by the hydrogel. Chitosan derivatives leverage amine and hydroxyl groups for efficient hydrogen bonding with water. These polymers act as both water conduits and structural supports for the carbon nitride dots, whose colorimetric response to humidity lies at the heart of the sensor.

Figure 3:
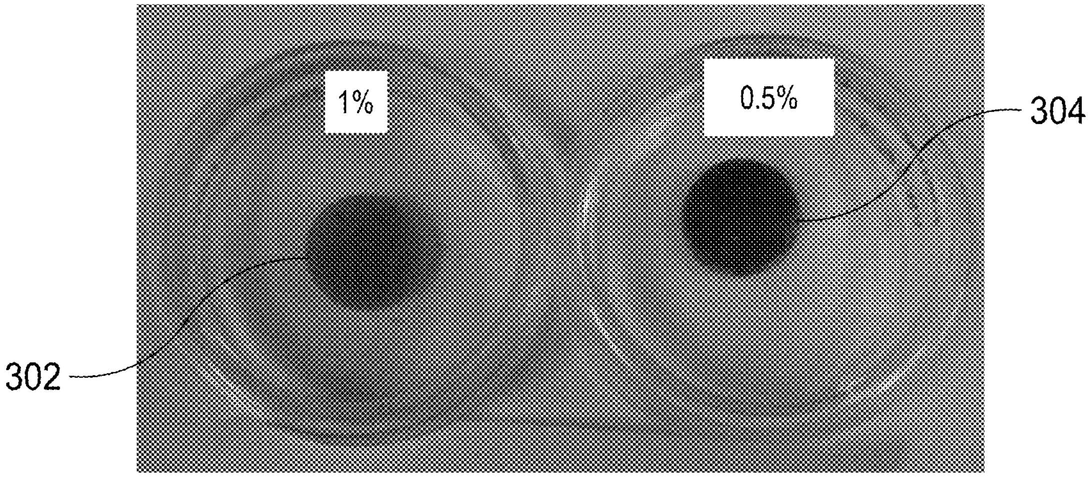
FIG. 3 depicts a comparison of humidity sensors comprising different concentrations of carbon nitride dots exposed to different environments in accordance with illustrative embodiments.

FIG. 3 depicts a comparison of humidity sensors comprising different concentrations of carbon nitride dots exposed to different environments in accordance with illustrative embodiments. In this example, the hydrogel in humidity sensor 302 includes 0.5% (percent weight) carbon nitride dot fillers in the hydrogel matrix. The hydrogel in humidity sensor 304 includes 1% (percent weight) carbon nitride dot fillers in the hydrogel matrix.

Humidity sensor 302 has been kept under dry conditions and not exposed to any humidity. In contrast, humidity sensor 304 has been exposed to an environment with 50% humidity at 50 degrees Celsius for 48 hours. As depicted, humidity sensor 302 exhibits a lighter color, while the hydrogel in humidity sensor 304 exhibits a darker color in comparison.

An advantage of the humidity sensor of the illustrative embodiments is that the detectable colorimetric response produced by the carbon nitrite dots reverses as the hydrogel dries. Therefore, in the example shown in FIG. 3, the color of the carbon nitride dots will change back to a lighter color as the hydrogel dries and its moisture content decreases. This reversibility of the carbon nitride dot colorimetric response allows the humidity sensor to reset and be repeatedly reused.

Figure 4:
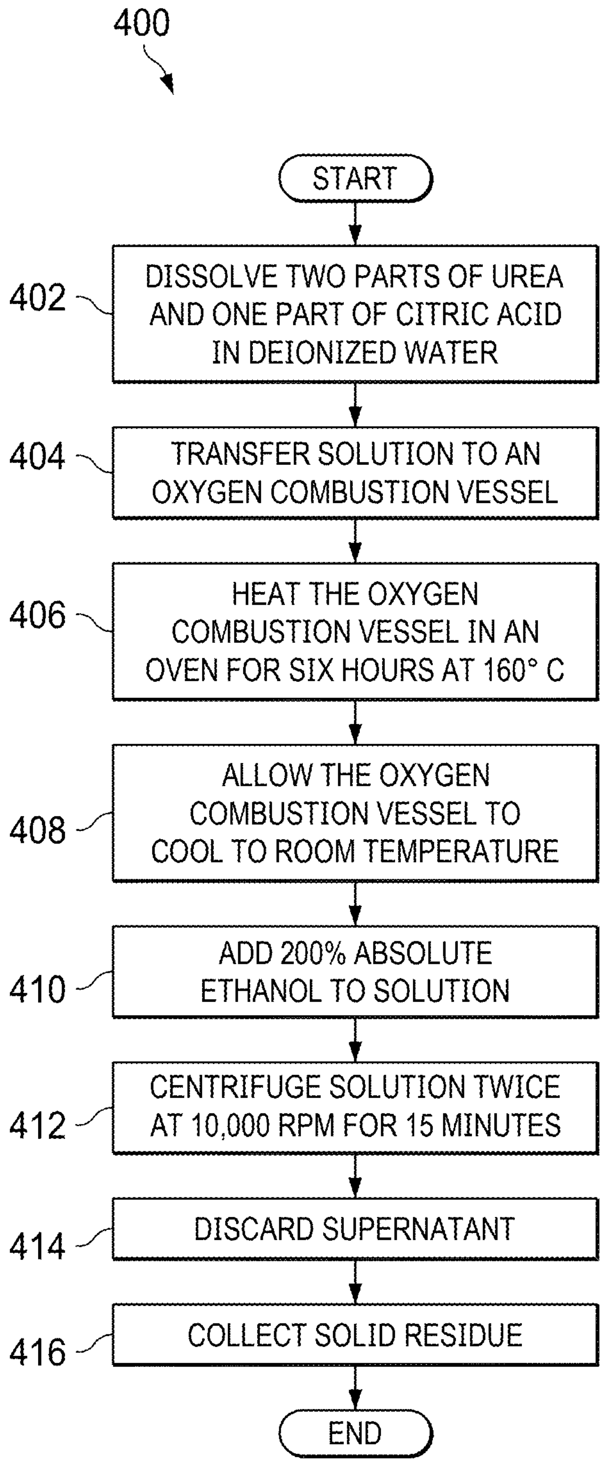
FIG. 4 depicts a flowchart illustrating a process for synthesizing carbon nitride dots in accordance with an illustrative embodiment.

FIG. 4 depicts a flowchart illustrating a process for synthesizing carbon nitride dots in accordance with an illustrative embodiment. Process 400 covers a bottom-up hydrothermal protocol to synthesize citric acid-urea (CAU) carbon nitride dots.

Process 400 begins by dissolving two parts of urea (e.g., 2 gm) and one part of citric acid (e.g., 1 gm) in deionized water (e.g., 10 ml) (step 402). The solution is then transferred to an oxygen combustion vessel (e.g., Parr® oxygen bomb) (step 404). The oxygen combustion vessel is heated in an oven for six hours at 160° C. (step 406).

After six hours of heating, the oxygen combustion vessel is cooled to room temperature (step 408), and 200% absolute ethanol is added to the solution to increase solubility of unreacted citric acid in aqueous solution and precipitate the carbon nanostructure (step 410).

The solution is then centrifuged twice at 10,000 rpm, for 15 minutes (step 412). The supernatant is discarded (step 414), and the solid residue is collected (step 416). Process 400 then ends.

Figure 5:
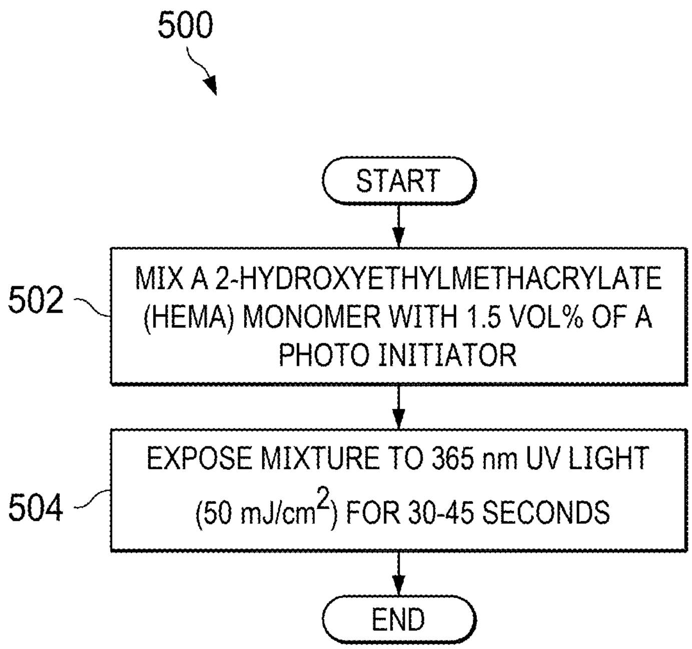
FIG. 5 depicts a flowchart illustrating a process for synthesizing hydrogel in accordance with an illustrative embodiment.

FIG. 5 depicts a flowchart illustrating a process for synthesizing hydrogel in accordance with an illustrative embodiment. Process 500 covers the synthesis of a polyhydroxyethylmethacrylate (PHEMA) hydrogel.

Process 500 begins by mixing a 2-hydroxyethylmethacrylate (HEMA) monomer (Sigma-Aldrich, 98%) with 1.5 vol % of a photo initiator (e.g., Darocure 1173 (Sigma-Aldrich®, 97%)) (step 502). This mixture is then exposed to 365 nm ultraviolet (UV) light (50 $mW/cm^2$) for 30-45 seconds to obtain a partially cross-linked PHEMA hydrogel precursor (step 504). Process 500 then ends.

Figure 6:
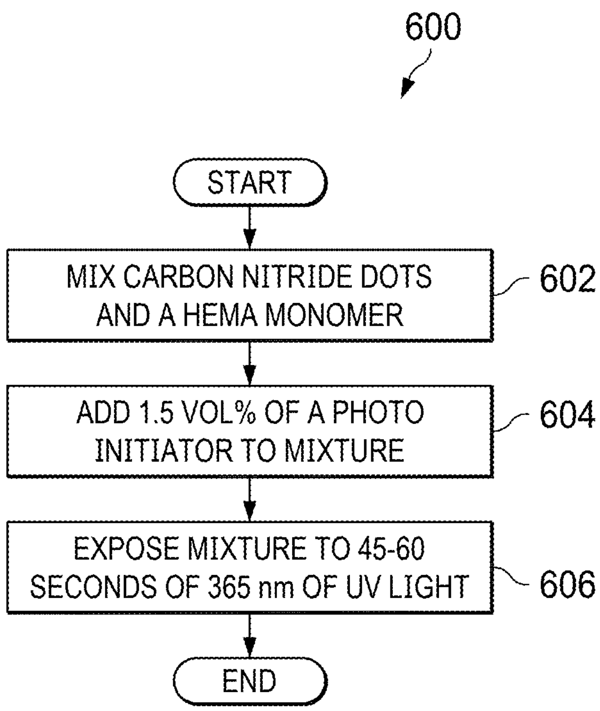
FIG. 6 depicts a flowchart illustrating a process for synthesizing carbon nitride dot-doped nanocomposite hydrogel in accordance with an illustrative embodiment.

FIG. 6 depicts a flowchart illustrating a process for synthesizing carbon nitride dot-doped nanocomposite hydrogel in accordance with an illustrative embodiment. The PHEMA-carbon nitride dot nanocomposite hydrogel is synthesized by mixing carbon nitride dots and a HEMA monomer (step 602). Typical mixing time is from 2-5 minutes to break up the aggregated carbon nitride dot particles.

Mixing can be performed with a variety of methods. For example, mixing might be accomplished with vortexing or planetary centrifugal mixing (e.g., Thinky® mixer). Another mixing method is ultrasonication in which high-frequency sound waves breaks down agglomerates of nanoparticles and promote uniform dispersion of nanoparticles in the polymer. Mechanical shearing utilizes forces that physically disrupt nanoparticle clusters, leading to a more homogeneous mixture. Solution mixing comprises simple stirring of the components in a suitable solvent and can achieve suitable dispersion for some systems. High-speed stirring involves increased agitation that enhances mixing efficiency, particularly for viscous solutions. Surfactants and dispersants are additives that help stabilize nanoparticles and prevent aggregation, allowing better dispersions within the polymer matrix. The choice of mixing method depends on factors such as nanoparticle size and desired level of homogeneity.

After mixing, the nanocomposite is synthesized by in-situ free radical polymerization. 1.5 vol % of a photo initiator such as Darocure 1173 is added to the mixture (step 604). The mixture of HEMA, carbon nitride dots, and photo initiator is then exposed to 45-60 seconds of 365 nm of UV light (50 mJ/cm$^2$) (step 606). Process 600 then ends.

As used herein, "a number of," when used with reference to items, means one or more items. Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts illustrate the operation of some possible implementations of methods in an illustrative embodiment. In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A humidity sensor, comprising:
a hydrogel comprising a hydrophilic polymer; and
carbon nitride dots embedded in the hydrogel, wherein the carbon nitride dots generate a colorimetric response in visible light in response to absorption of moisture by the hydrogel.

2. The humidity sensor of claim 1, wherein the colorimetric response of the carbon nitride dots reverses in response to loss of moisture in the hydrogel.

3. The humidity sensor of claim 1, wherein the colorimetric response of the carbon nitride dots comprises a darkening in color in response to moisture.

4. The humidity sensor of claim 1, wherein the hydrophilic polymer comprises at least one of:
hydroxyethylmethacrylate;
glyceryl methacrylate; or
chitosan derivatives.

5. The humidity sensor of claim 4, wherein the hydroxyethylmethacrylate comprises varying polyethylene glycol (PEG) side chains.

6. A method of synthesizing a carbon nitride dot-doped nanocomposite hydrogel, the method comprising:
mixing a hydrophilic polymer with carbon nitride dots;
adding 1.5 vol % of a photo initiator to the mixture of hydrophilic polymer and carbon nitride dots; and
exposing the mixture of hydrophilic polymer, carbon nitride dots, and photo initiator to ultraviolet light to produce a hydrogel embedded with the carbon nitride dots, wherein the carbon nitride dots generate a colorimetric response in visible light in response to absorption of moisture by the hydrogel.

7. The method of claim 6, wherein the colorimetric response of the carbon nitride dots reverses in response to loss of moisture in the hydrogel.

8. The method of claim 6, wherein the hydrophilic polymer comprises at least one of:
hydroxyethylmethacrylate;
glyceryl methacrylate; or
chitosan derivatives.

9. The method of claim 8, wherein the hydroxyethylmethacrylate comprises varying polyethylene glycol (PEG) side chains, enabling tuning of water uptake by the hydrogel.

10. The method of claim 6, wherein the hydrophilic polymer and carbon nitride dots are initially mixed for 2-5 minutes to break up the aggregated carbon nitride dot particles.

11. The method of claim 6, wherein the hydrophilic polymer and carbon nitride dots are mixed by:
vortexing;
planetary centrifugal mixing;
ultrasonication;
mechanical shearing;
solution mixing;
high-speed stirring; or
surfactants and dispersants.

12. The method of claim 6, wherein the mixture of hydrophilic polymer, carbon nitride dots, and photo initiator are exposed to the ultraviolet light 45-60 seconds, and wherein the ultraviolet light has a wavelength of 365 nm.

13. A method of detecting humidity, the method comprising:
embedding carbon nitride dots into a hydrogel comprising a hydrophilic polymer, wherein the carbon nitride dots generate a colorimetric response in visible light in response to absorption of moisture by the hydrogel, and wherein the colorimetric response of the carbon nitride dots reverses in response to loss of moisture in the hydrogel; and detecting changes in humidity according to the colorimetric response of the carbon nitride dots in the hydrogel.

14. The method of claim 13, wherein the colorimetric response of the carbon nitride dots comprises a darkening in color in response to moisture.

15. The method of claim 13, wherein the hydrophilic polymer comprises at least one of:

hydroxyethylmethacrylate;

glyceryl methacrylate; or chitosan derivatives.

16. The method of claim 15, wherein the hydroxyethylmethacrylate comprises varying polyethylene glycol (PEG) side chains.

* * * * *